(12) United States Patent
Bratina et al.

(10) Patent No.: US 6,932,853 B2
(45) Date of Patent: Aug. 23, 2005

(54) MECHANICAL SEPARATION OF VOLATILE METALS AT HIGH TEMPERATURES

(75) Inventors: James E. Bratina, Greenwood, IN (US); Fred M. Fehsenfeld, Indianapolis, IN (US)

(73) Assignee: Heritage Environmental Services LLC, Indianapolis, IN (US)

(*) Notice: Subject to any disclaimer, the term of this patent is extended or adjusted under 35 U.S.C. 154(b) by 75 days.

(21) Appl. No.: 10/608,351

(22) Filed: Jun. 27, 2003

(65) Prior Publication Data

US 2004/0261577 A1 Dec. 30, 2004

(51) Int. Cl.⁷ ............................................. C22B 7/02
(52) U.S. Cl. .................... 75/401; 75/406; 75/407; 75/663; 75/664; 75/665; 75/961; 423/107; 423/623
(58) Field of Search .................. 75/401, 406, 407, 75/663, 664, 961, 665; 78/665; 423/107, 623

(56) References Cited

U.S. PATENT DOCUMENTS

| | | | |
|---|---|---|---|
| 4,108,634 A | 8/1978 | Rahn et al. | |
| 4,200,454 A | 4/1980 | Maekzer et al. | |
| 4,822,410 A * | 4/1989 | Matovich | 75/345 |
| 5,474,592 A | 12/1995 | Bresser et al. | |
| 5,567,225 A | 10/1996 | Bernard et al. | |
| 5,667,553 A | 9/1997 | Keegel, Jr. | |
| 5,766,307 A | 6/1998 | Miyagawa et al. | |
| 6,395,060 B1 | 5/2002 | Horne et al. | 75/961 |
| 6,464,753 B2 | 10/2002 | Horne et al. | 75/694 |
| 6,682,586 B2 * | 1/2004 | Frame et al. | 75/658 |
| 6,831,939 B2 * | 12/2004 | Bratina et al. | 373/7 |
| 2002/0011133 A1 | 1/2002 | Horne et al. | |
| 2004/0091014 A1 * | 5/2004 | Bratina et al. | 373/7 |

* cited by examiner

Primary Examiner—Melvyn Andrews
(74) Attorney, Agent, or Firm—Butzel Long

(57) ABSTRACT

A method of operating mechanical separation devices at high temperatures to separate various volatile metals, metal halides and metal oxides to produce high purity materials.

27 Claims, 1 Drawing Sheet

MECHANICAL SEPARATION OF VOLATILE METALS AT HIGH TEMPERATURES

TECHNICAL FIELD

The present invention relates to processes and apparatus for the separation of volatile metals, including elemental metals and metal compounds including metal oxides and metal halides, etc. More particularly, the present invention relates to processes and apparatus for the separation of volatile metals from mixtures thereof which involve the use of mechanical or physical separation devices and systems.

BACKGROUND ART

During the production of metal compounds it is known to use thermal processes to remove volatile metal compounds from feed materials. For example, thermal processes can involve the use of chemical reactions to convert metal oxides into their corresponding elemental metals. When the elemental metals are volatile at the operating temperatures of the process, these volatile metals can be removed along with other compounds being processed. For example, metal halides that may be present have boiling points that are typically lower than the metal oxides in the feed materials and thus can be removed together as a vapor stream together with other volatile metals. Thermal processes thus can be used to remove specific metals present in process feed materials as volatile metals and metal compounds.

As the volatile metals are removed from the less volatile components of the feed materials, they can be reacted with air to form metal oxides which can be subsequently processed to recover materials of interest. This type of thermal processing method has been used in the refinement of some ores and in the processing of waste materials to remove specific materials of interest. The volatile metals and metal compounds that are thermally released in such processes are normally allowed to cool and condense. Once condensed, the metal compounds can be collected in a dust collection system for use or disposal.

Electric arc furnace (EAF) dust is a waste material that is generated during the production of steel in electric arc furnaces. During the production of steel, EAF dust is captured and collected for either disposal or recycle.

The major components in EAF dust are iron (up to 50 wt. %) and zinc (up to 30 wt. %), usually in the oxide form. In addition, EAF dust contains smaller quantities of calcium, magnesium, manganese, lead, cadmium, chloride, fluoride and other trace elements.

Generally, it can be economical to process EAF dust having a high zinc content using existing zinc recovery procedures, and send EAF dust having a low zinc content to be chemically stabilized and landfilled for disposal as a waste.

The thermal processes discussed above have been used in the processing of EAF dust to remove volatile metals including zinc, lead and cadmium. The EAF dust is processed by adding a reducing material thereto and then heating the resulting mixture. As desirable volatile metals are formed, they are released from the mixture, along with other less desirable and/or undesirable volatile materials, such as metal halides. As the volatile materials leave the process, they are collected and mixed with air or oxygen so that at least the elemental volatile metal components form metal oxides in a hot gaseous stream. The gaseous stream is then cooled to condense the mixture of compounds and the condensed material is collected in a dust collection system.

The material collected from processing of EAF dust as discussed above is referred to as a crude zinc oxide material and typically comprises zinc oxide, zinc chloride, lead chloride, cadmium and cadmium chloride. While this mixture has some commercial value depending on the composition, the value of a high purity zinc oxide would be much higher and is desired.

The separation of the crude zinc oxide material into more valuable high purity zinc oxide can be performed in a second separate step using either a second thermal or wet chemical process. However, the use of a second process increases costs proportionally to the additional energy that must be spent to separate the compounds from the mixture. Thermal processing of crude zinc oxide materials would involve the heating of the material in an oxidizing atmosphere to a temperature in excess of the boiling temperature of the impurities to be removed. In the case of crude zinc oxide material, the material would have to be heated to a temperature of over 1800° F. in order to volatilize lead halides, cadmium halides, cadmium and zinc chloride. This heating process could be performed in a rotary kiln, tunnel kiln, rotary hearth furnace or similar heating apparatus.

An alternative to thermal processing would be to separate specific metal oxides from impurities using a wet chemical process to dissolve and wash impurities away from the desired metal oxide products. This washing would be performed at specific pH levels to leave the desired metal in the oxide form while washing away impurities such as halides.

The following patents exemplify various systems that process volatile metals: U.S. Pat. No. 4,108,634 to Rahn et al., U.S. Pat. No. 4,200,454 to Maelzer et al., U.S. Pat. No. 5,474,592 to Bresser et al., U.S. Pat. No. 5,567,225 to Bernard et al., U.S. Pat. No. 5,667,553 to Keegel, Jr., U.S. Pat. No. 5,766,307 to Miyagawa et al., U.S. Pat. No. 6,395,060 to Home, et al., and U.S. Pat. No. 6,464,753 to Home et al. In addition, pending patent application Ser. No. 2002/001133 to Horn et al. discloses a system for processing volatile metals.

The present invention provides processes and apparatus for the separation of volatile metals, from mixtures thereof which involve the use of mechanical or physical separation devices and systems.

DISCLOSURE OF THE INVENTION

According to various features, characteristics and embodiments of the present invention which will become apparent as the description thereof proceeds, the present invention provides a method for removing a desired metal oxide from a hot gas stream that includes the volatile metal oxide and at least one of an additional volatile metal/metal oxide and a metal halide, the method involves the steps of:

a) providing a hot gas stream from a source thereof, the hot gas stream comprising a desired metal oxide and at least one of an additional volatile metal/metal oxide and a metal halide;

b) providing a mechanical separation device for separating any solids from the hot gas stream;

c) feeding the hot gas stream into the mechanical separation device at a temperature that is less than the boiling temperature of the desired metal oxide and greater than the boiling temperature of the at least one additional volatile metal/metal oxide and metal halide present in the gas stream so as to separate the desired metal oxide from the at least one additional volatile metal/metal oxide and metal halide present in the gas stream; and d) collecting the separated desired metal oxide.

The present invention further provides a method of recovering a volatile metal from a metal processing feed which involves the steps of:

a) providing a metal processing apparatus in which metal mixtures can be heat processed;

b) feeding into the metal processing apparatus a mixture of volatile metals and metal compounds together with a reductant capable of reducing metal compounds to pure metals;

c) heating the contents of the metal processing apparatus to cause volatile materials to form a released gaseous mixture including a desired volatile metal component;

d) feeding the released gaseous mixture into a mechanical separation device;

e) separating the desired volatile metal component from the remaining portion of the released gaseous mixture; and f) collecting the separated desired volatile metal component.

The present invention also provides a method of recovering zinc from electric arc furnace dust which involves the steps of:

a) combining electric arc furnace dust with at least a reductant capable of reducing zinc oxide to zinc in a thermal processing apparatus;

b) heating the thermal processing apparatus to cause reduced zinc oxide to vaporize together with other volatile components;

c) oxidizing the vaporized zinc;

d) feeding the oxidized zinc and other volatile components into a mechanical separation device capable of separating the oxidized zinc from the other volatile components; and e) collecting the separated oxidized zinc.

BRIEF DESCRIPTION OF DRAWINGS

The present invention will be described with reference to the attached FIG. 1 which is given as non-limiting example only and is a block flow diagram showing the steps of separating volatile metals at high temperatures according to one embodiment of the present invention.

BEST MODE FOR CARRYING OUT THE INVENTION

Figure 1:
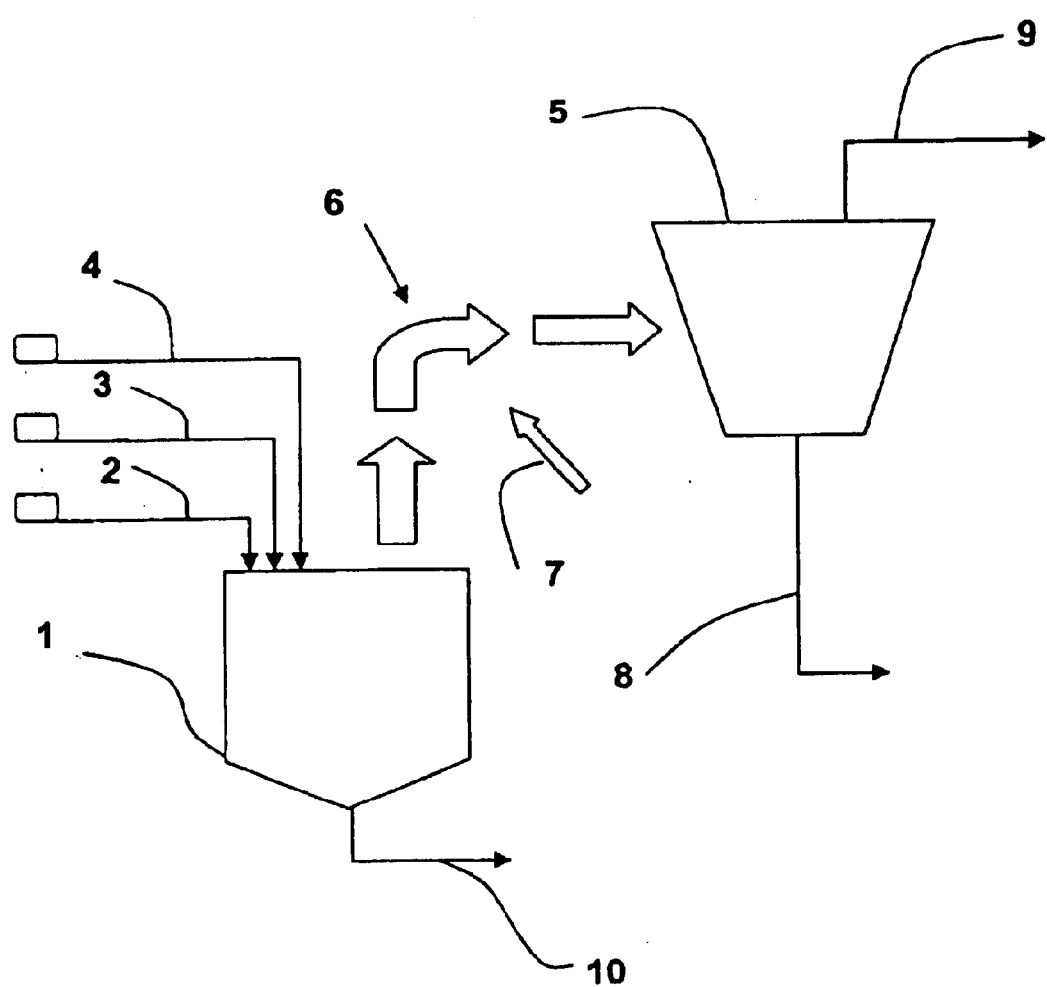

The present invention is directed to processes and apparatus for the separation of volatile metals, including elemental metals and metal compounds including metal oxides and metal halides, etc. which processes and apparatus involve the use of mechanical or physical separation devices and systems.

The processes and apparatus of the present invention can be used to process hot gaseous streams that exit metal separation processes to produce high purity metal oxides. The invention can be used to separate zinc, lead and/or cadmium (as oxides) from other metals and metal halides present in the streams produced by a thermal processes, including metals and metal halides such as lead halides, cadmium halides or cadmium metal. The process of the present invention uses mechanical separation at high temperatures to remove volatile metals and metal halides from the desired metal or metal oxides.

The present invention can use any mechanical separation device that is capable of separating volatile metals at high temperatures, including, for example only, cyclone separators, settling chambers, impingement separators, impaction separators, mechanical filters and other mechanical devices. In operation, the mechanical separation devices used according to the present invention separate metal oxides from volatile metals, metal halides and other compounds. The invention is particularly applicable to processes where metal oxides (including zinc oxide) are formed during a process in the presence of other metals, metal oxides and metal halides.

A specific embodiment of the present invention will be discussed in reference to FIG. 1 which is a block flow diagram showing the steps of separating volatile metals at high temperatures according to one embodiment of the present invention. Although reference is made in this embodiment to the processing of electric arc furnace (EAF) dust, it is to be understood that other types of materials feeds containing zinc and/or other types of volatile metals could be processed according to the present invention for separation of the volatile metals.

FIG. 1 depicts a furnace 1 which is capable of being charged with at least a material feed containing volatile metals such as EAF dust and a carbon source such as coke or other reductant. The carbon source insures that a reducing environment exists within the furnace. In such a reducing environment, the metal oxides of the volatile metals in the EAF dust are converted into their metal forms. Depending on the type of furnace used it is also possible to include, as a feed a source of iron. For example, if an induction furnace is used, providing a molten bath of scrap iron can serve as a heat source and provide an economic means for separating volatile metals according to the present invention, when processing the scrap iron. In the case of using a rotary kiln as the furnace, separate feeds of a material containing volatile metals such as EAF dust and a carbon source such as coke are all that are necessary. In practice, any conventional furnace or processing apparatus can be used which provides a hot gaseous release of volatile metals as discussed below. Exemplary furnaces include induction furnaces, open hearth furnaces, rotary kilns, tunnel kilns, rotary hearth furnaces, etc.

In FIG. 1 the furnace 1 is depicted as including several material feeds including a line 2 for charging a material feed containing volatile metals such as EAF dust into the furnace 1 and a line 3 for charging a carbon source such as coke or other reducing agent into the furnace 1. In addition, an optional feed line 4 is depicted and can be used to feed an iron containing, material such as scrap iron, iron ore, hot metal, sinter dust, basic oxygen furnace sludge, etc. into furnace 1.

At the operating temperature of the furnace during the thermal treatment processes, zinc and other volatile metals and metal halides boil out of the mixture of feed materials and can be removed from the furnace. The hot metal and metal compound vapors which are released can be collected by a suitable recovery means and fed into a mechanical separation device 5 are depicted by block arrows 6 in FIG. 1. The volatile metals such as zinc, lead and cadmium are in their elemental forms as they are released from original the feed materials. In order to oxidize volatile metals a source of oxygen or air can be added to the released and recovered vapors as indicated by block arrow 7. The volatile materials that are oxidized will condense as solid particles that can be collected from the remaining higher volatile gaseous compounds by the mechanical separation device 5. These condensed volatile materials are removed from the mechanical separator device as indicated by line 8 The higher volatile gaseous compounds can be removed from the mechanical separator device as indicated by line 9 and subjected to any desirable further processing. The materials that remain in the furnace 1 after the volatile metals and compounds are released can be discharged as indicated by line 10.

The mechanical separation device can comprise a cyclone separator, a settling chamber, an impingement separator, an impaction separator, mechanical filter or other conventional mechanical separation device.

In the case of separating and recovering zinc, by keeping the temperature of the gas stream in excess of 1800° F. (982° C.), more volatile compounds such as cadmium, zinc chloride, cadmium chloride and lead chloride will remain in the gas phase while zinc oxide will condense as a solid. Sending the hot gas stream through mechanical separation device 5 allows the zinc oxide to be collected with relatively few impurities.

The process of the present invention can be used in conjunction with existing thermal processes which process or treat metal feeds containing volatile metals at high temperatures. In such instances, the process of the present invention may not require the input of additional energy, but only the installation and operation of a mechanical separator device.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method for removing a desired metal oxide from a hot gas stream that comprises the desired metal oxide and at least one of an additional volatile metal/metal oxide and a metal halide, said method comprising the steps of:
   a) receiving a hot gas stream from a, metal or metal waste processing system, said hot gas stream comprising a desired metal oxide and at least one of an additional volatile metal/metal oxide and a metal halide and being at a temperature at which the desired metal oxide, and each of the at least one of an additional volatile metal/metal oxide and metal halide are all in the form of vapors;
   b) providing a mechanical separation device for separating any solids from said hot gas stream;
   c) feeding the hot gas stream into the mechanical separation device at a temperature that is less than the boiling temperature of the desired metal oxide and greater than the boiling temperature of remaining components of the gas stream so as to separate the desired metal oxide from the remaining components of the gas stream as a product having relatively few impurities; and
   d) collecting the separated desired metal oxide.

2. A method for removing a desired metal oxide from a hot gas stream that comprises the desired metal oxide and at least one of an additional volatile metal/metal oxide and a metal halide according to claim 1, wherein in step a) the hot gas stream comprises a volatile metal which is oxidized to form the desired metal oxide that is separated in step c).

3. A method for removing a desired metal oxide from a hot gas stream that comprises the desired metal oxide and at least one of in additional volatile metal/metal oxide and a metal halide according to claim 2, wherein a source of oxygen is added to the hot gas stream to form the desired metal oxide that is separated in step c).

4. A method for removing a desired metal oxide from a hot gas stream that comprises the desired metal oxide and at least one of an additional volatile metal/metal oxide and a metal halide according to claim 1, wherein the metal oxide that is separated in step c) is zinc oxide.

5. A method for removing a desired metal oxide from a hot gas stream that comprises the desired metal oxide and at least one of an additional volatile metal/metal oxide and a metal halide according to claim 1, wherein the hot gas stream is provided from a furnace.

6. A method for removing a desired metal oxide from a hot gas stream that comprises the desired metal oxide and at least one of an additional volatile metal/metal oxide and a metal halide according to claim 1, wherein the mechanical separation device comprises at least one of a cyclone separator, a settling chamber, an impingement separator and a mechanical filter.

7. A method for removing a desired metal oxide from a hot gas stream that comprises the desired metal oxide and at least one of an additional volatile metal/metal oxide and a metal halide according to claim 1, wherein the additional volatile metal/metal oxide comprises a halide compound.

8. A method of recovering a volatile metal from a metal processing feed which comprises the steps of:
   a) providing a metal processing apparatus in which metal mixtures can be heat processed;
   b) feeding into the metal processing apparatus a mixture of volatile metals and metal compounds together with a reductant capable of reducing metal compounds to pure metals;
   c) heating the contents of the metal processing apparatus to cause volatile materials to vaporize and form a released gaseous mixture including a desired volatile metal component;
   d) removing the released gaseous mixture from metal processing apparatus;
   e) feeding the released gaseous mixture into a mechanical separation device at a temperature that is less than the boiling temperature of the desired metal component and greater than the boiling temperature of remaining components of the gaseous mixture sons to separate the desired metal component from the remaining components of the gaseous mixture as a product having relatively few impurities;
   f) collecting the separated desired volatile metal component.

9. A method of recovering a volatile metal from a metal processing feed according to claim 8, wherein the mixture of volatile metals and metal compounds comprises a first feed that contains the desired volatile metal component and a second food that contains the reductant.

10. A method of recovering a volatile metal from a metal processing feed according to claim 9, wherein the mixture of volatile metals and metal compounds further comprises an additional feed of an iron-containing material.

11. A method of recovering a volatile metal from a metal processing feed according to claim 10, wherein the iron-containing material comprises at least one of scrap iron, iron ore, sinter dust and basic oxygen furnace sludge.

12. A method of recovering a volatile metal from a metal processing feed according to claim 9, wherein the first feed comprises electric arc furnace dust.

13. A method of recovering a volatile metal from a metal processing feed according to claim 8, wherein the reductant comprises a carbon source.

14. A method of recovering a volatile metal from a metal processing feed according to claim 13, wherein the carbon source comprises coke.

15. A method of recovering a volatile metal from a metal processing feed according to claim 8, wherein the metal processing apparatus comprises a furnace.

16. A method of recovering a volatile metal from a metal processing feed according to claim 15, wherein the metal processing apparatus comprises at least one of an induction furnace, an open hearth furnace, a rotary kiln, a tunnel kiln and a rotary hearth furnace.

17. A method of recovering a volatile metal from a metal processing feed according to claim 8, wherein the mechanical separation device comprises at least one of a cyclone separator, a settling chamber, an impingement separator and a mechanical filter.

18. A method of recovering a volatile metal from a metal processing feed according to claim 8, wherein a source of oxygen is combined with the released gaseous mixture to oxidize the desired volatile metal component before step e).

19. A method of recovering a volatile metal from a metal processing feed according to claim 8, wherein the desired volatile metal component comprises zinc.

20. A method of recovering a volatile metal from a metal processing feed according to claim 8, wherein the mixture of volatile metals and metal compounds comprise a halide compound.

21. A method of recovering zinc from electric arc furnace dust which comprises the steps of:
   a) combining electric arc furnace dust with at least a reductant capable of reducing zinc oxide to zinc in a thermal processing apparatus;
   b) heating the thermal processing apparatus to cause reduced zinc oxide to vaporize together with other volatile components and form a gaseous stream
   c) oxidizing the vaporized zinc in the gaseous stream to form zinc oxide;
   d) feeding the gaseous stream into a mechanical separation device at a temperature that is less than the boiling temperature of zinc oxide and greater than the boiling temperature of remaining components of the gaseous stream so as to separate the zinc oxide from the remaining components of the gaseous mixture as a product having relatively few impurities;
   e) collecting the separated zinc oxide.

22. A method of recovering zinc from electric arc furnace dust according to claim 21, wherein in step a) the electric arc furnace dust is further combined with an iron-containing material.

23. A method of recovering zinc from electric arc furnace dust according to claim 21, wherein the iron-containing material comprises at least one of scrap iron, iron ore, sinter dust and basic oxygen furnace sludge.

24. A method of recovering zinc from electric arc furnace dust according to claim 21, wherein a source of oxygen is added to the zinc vapor in step c) to oxidize the zinc vapor.

25. A method of recovering zinc from electric arc furnace dust according to claim 21, wherein the mechanical separation device comprises at least one of a cyclone separator, a settling chamber, an impingement separator and a mechanical filter.

26. A method of recovering zinc from electric arc furnace dust according to claim 21, wherein the thermal processing apparatus comprises at least one of an induction furnace, an open hearth furnace, a rotary kiln, a tunnel kiln and a rotary hearth furnace.

27. A method of recovering zinc from electric arc furnace dust according to claim 21, wherein the collected zinc oxide is further processed to obtain purified zinc.

* * * * *